Figures 1, 2:
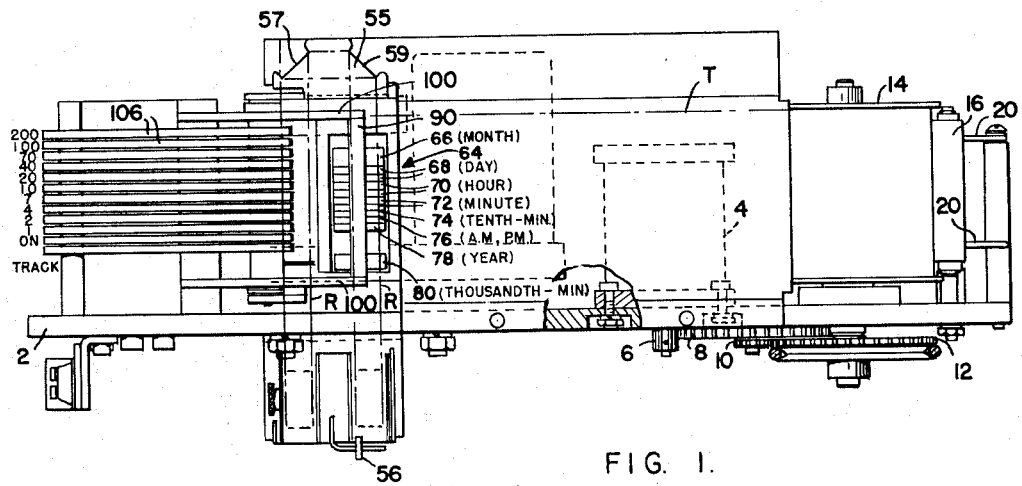

Oct. 17, 1961    J. S. WAPNER    3,004,817
EVENTS RECORDER
Filed Nov. 19, 1957    4 Sheets-Sheet 1

INVENTOR.
JOSEPH S. WAPNER
BY
ATTORNEYS

Oct. 17, 1961 J. S. WAPNER 3,004,817
EVENTS RECORDER
Filed Nov. 19, 1957 4 Sheets-Sheet 2

INVENTOR.
JOSEPH S. WAPNER
BY
ATTORNEYS

Oct. 17, 1961 J. S. WAPNER 3,004,817
EVENTS RECORDER
Filed Nov. 19, 1957 4 Sheets-Sheet 3

INVENTOR.
JOSEPH S. WAPNER
BY
ATTORNEYS

Oct. 17, 1961  J. S. WAPNER  3,004,817
EVENTS RECORDER
Filed Nov. 19, 1957  4 Sheets-Sheet 4

INVENTOR.
JOSEPH S. WAPNER
BY
ATTORNEYS

United States Patent Office 3,004,817
Patented Oct. 17, 1961

3,004,817
EVENTS RECORDER
Joseph S. Wapner, Levittown, Pa., assignor to Fischer & Porter Company, Hatboro, Pa., a corporation of Pennsylvania
Filed Nov. 19, 1957, Ser. No. 697,402
12 Claims. (Cl. 346—34)

This invention relates to a recorder for events, typically operations of equipment, the recorder being particularly adapted to identify events as to both sequence and actual time, especially in cases where the events occur within a few milliseconds of each other.

A typical use for the invention is that existing in a power station. Depending on the size and nature of the station, there may range from relatively few to thousands of points in the system which are desirably monitored for control purposes, analysis of troubles which may have occurred, establishment of economic obligations, or the like. In cases of trouble, a large number of events may occur at different points in the system within a very short interval of time. These events will generally involve operations of relays, openings and closings of circuit breakers, manually operated switches, etc., each of which events may, by the location of a relay at a suitable point in the system, give rise to an electrical signal suitable for recording purposes. In accordance with the present invention, signals originating at various points are recorded accurately as to time and are completely identified on an easily read tape. Upon the occurrence of an event at a point connected to the apparatus, the tape is set in motion so as to record the times of events at other points which may result by reason of the occurrence of the first event. Each event is identified as to its point of origin, and, furthermore, it is identifiable as to what occurred at that point, e.g., whether a relay closed or opened, or which of some other alternative operations took place. Tape motion starts with the occurrence of the first event of a series and will continue through the period of events which occur in rapid sequence and will stop only after a predetermined interval following the last event of such sequence. This interval is chosen on the supposition that events are not related if one occurs following another only after a substantial period of time. For example, in a power plant it may be assumed that events are unrelated if they are spaced by an interval greater than one-fifth of a second.

The fact that the tape is stationary except for short intervals of recording means that a supply of tape of convenient size may have to be replaced only after several months of normal operation. To identify the precise clock time at which an event or the first of a series of events occurs, the tape is imprinted with the date and clock time, the latter being determinable to an accuracy better than .005 second in terms of time established by the frequency of the power system itself, so that with correlations of times of two or more of such recorders the occurrences of events at distant stations may be accurately correlated.

In accordance with the present invention a recording system is provided which is extremely reliable and trouble-free in view of the fact that timing wheels, stepping switches, synchronization circuits, memory banks, and other potential sources of trouble are eliminated. Transistors are used for amplification and semi-conductor diodes as buffers, rectifiers, etc., thereby eliminating the necessity for thermionic tube replacements.

While the invention is particularly applicable to power station requirements, it will become evident that it may be used, generally in a simpler form, for many other purposes, as in processing plants, in conjunction with electrical or pneumatic control equipment, or the like. All that is required for these uses is that there should be some transducing means to give an electrical signal upon the occurrence of each event of interest. Such signals may originate with positions, weights, or forces which through switches, sound pickups, photoelectric devices, or the like may give rise to electrical signals. Temperatures, pressures, radiations, etc., may thus be monitored.

Figure 3:
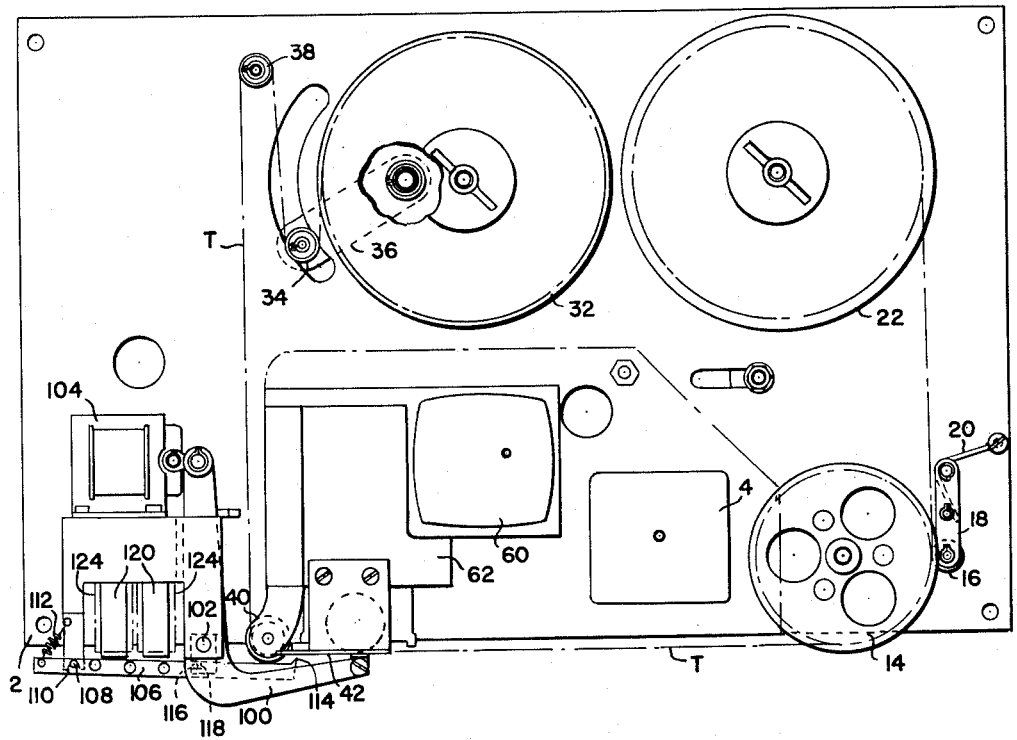
Figure 7:
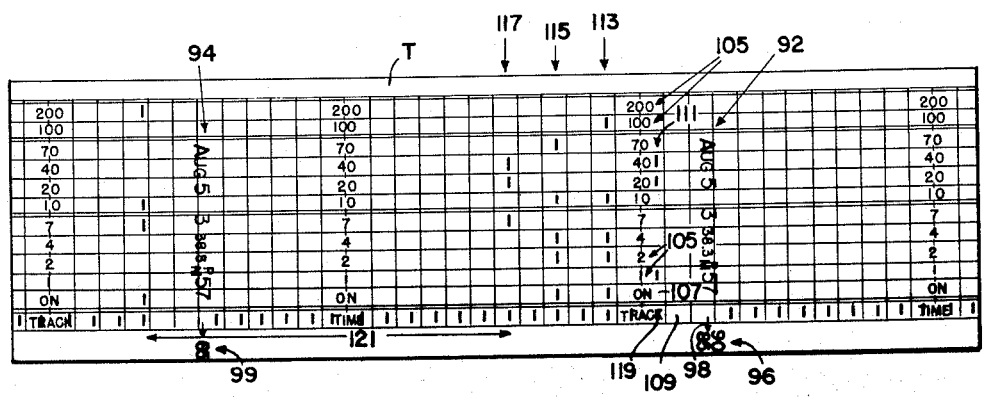
Figure 4:
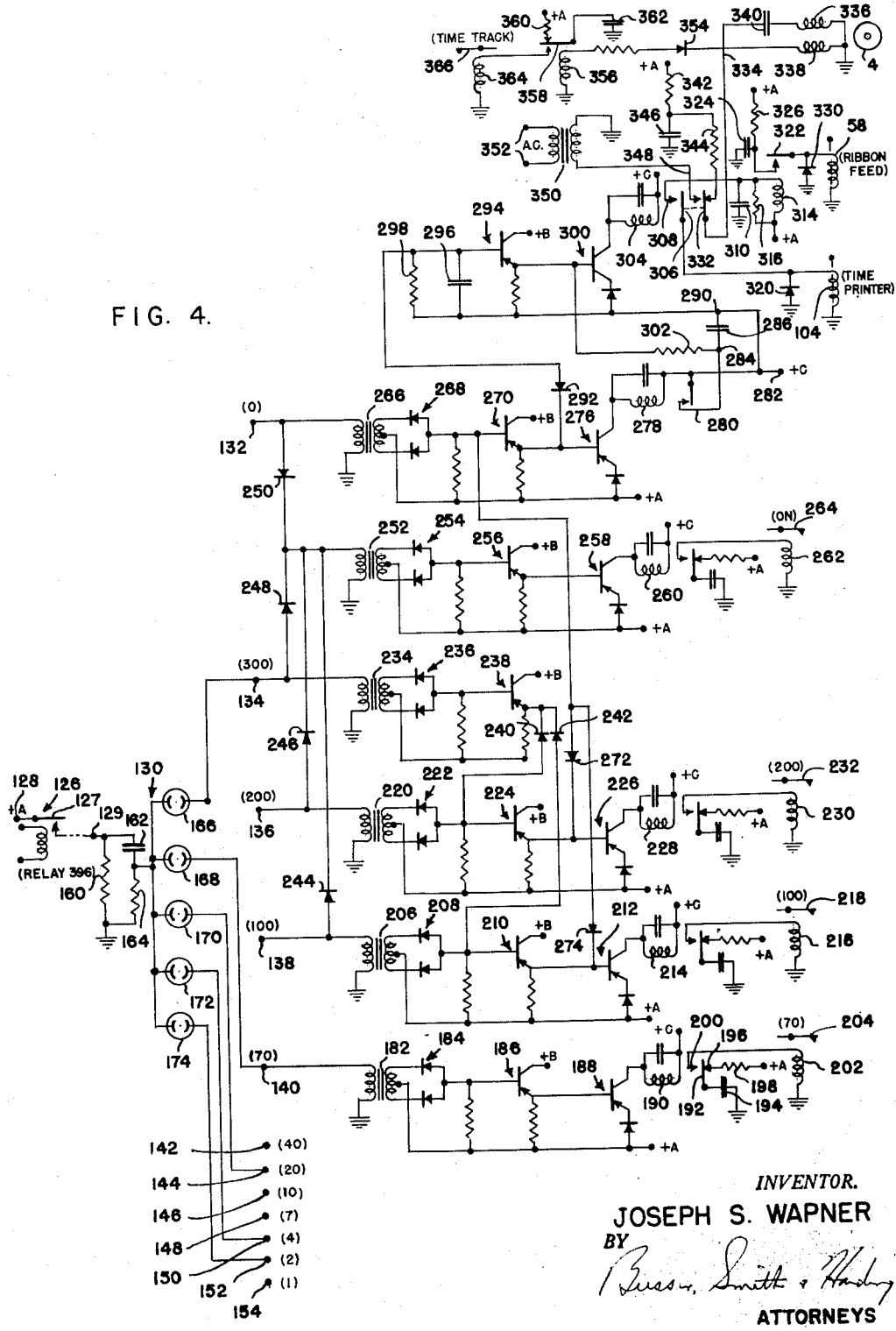
Figure 5:
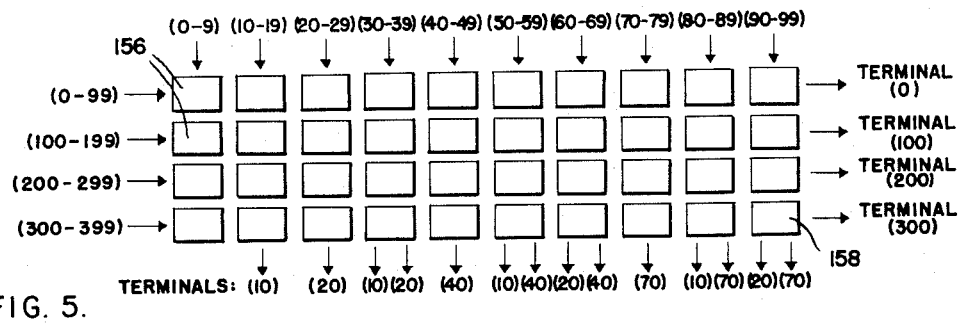
Figure 6:
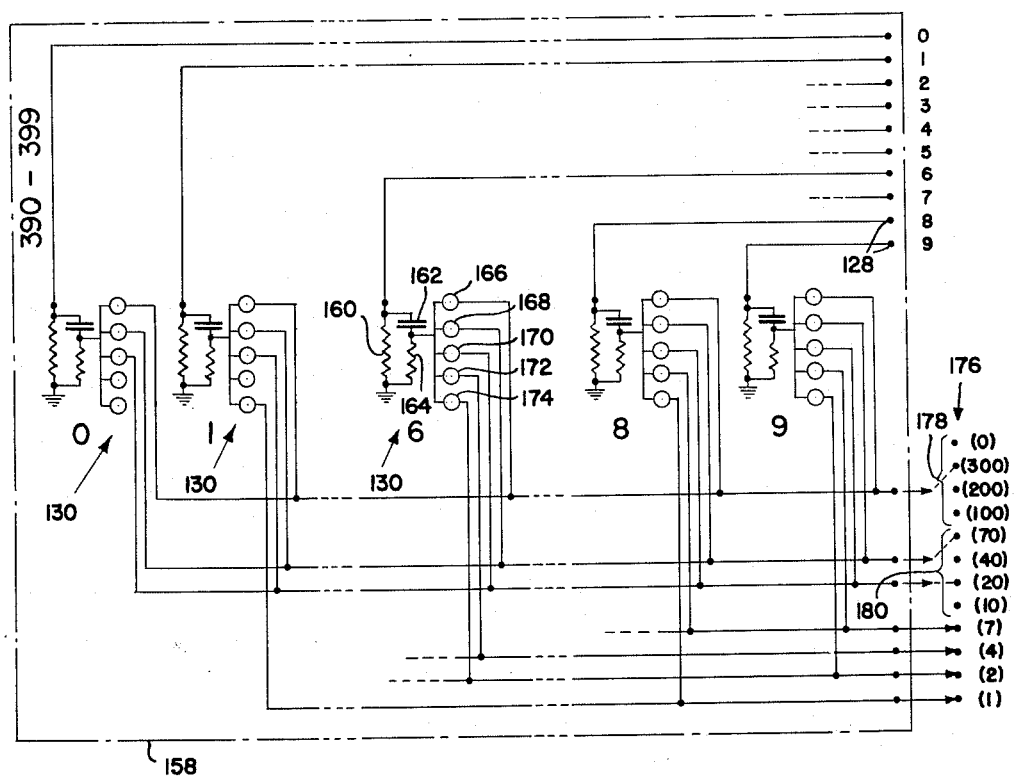

The general objects of the invention relate to the attainment of recording as already generally described. Other objects of the invention relate to details of construction and operation which will become more apparent from the following description, read in conjunction with the accompanying drawings, in which:

FIGURE 1 is a front elevation of a recorder provided in accordance with the invention;
FIGURE 2 is a bottom plan view of the same;
FIGURE 3 is a top plan view of the same;
FIGURE 4 is a wiring diagram showing the electrical circuitry involved;
FIGURE 5 is a diagram illustrative of the nature of the coding panels involved;
FIGURE 6 is a wiring diagram explanatory of the arrangement of a single panel of the type shown in FIGURE 5; and
FIGURE 7 is an elevation of a portion of a typical record made by the apparatus.

Reference will be made first particularly to FIGURES 1, 2 and 3 which show the mechanical parts of the recorder. A frame 2 mounts these parts and is desirably enclosed within a suitable housing (not shown) provided with a window through which the record tape may be viewed. This housing may be either superimposed or remote from another housing (not shown) which encloses the coding and other electrical elements of the apparatus, suitable cable connections being provided between the various parts.

A motor 4 of high starting torque type drives through reduction gearing 6, 8, 10 and 12 the feed drum 14 for the record tape T, the latter being pressed against the drum by a roller 16 carried by arms 18 tensioned by springs 20. From the drum 14 the tape passes to the receiving reel 22 driven at a higher peripheral speed than the drum 14 through a spring belt 24 and a pair of pulleys 26 and 28, the belt being maintained under tension by an idler pulley 30, the arrangement being such as to permit slippage but with a takeup rate in excess of the rate of feed by the drum 14. The tape passes from a supply reel 32 around a roller 34 carried by pivoted arms 36, and thence about idler rollers 38 and 40 and across an anvil 42 and printing device to the feed drum 14. A spring 44 urges the shaft 45 carrying the arms 36 in a clockwise direction as viewed in FIGURE 2. Connected to this shaft 45 by a helical spring 46 is a band 48 which is secured by an adjustable bracket 50, the band 48 passing about a brake drum 52 carried by the spindle which supports the tape supply reel 32. The arrangement just described is to relieve the motor 4 of the inertial load of the tape reel 32 upon starting and to prevent overrun of the reel 32. When the motor starts, driving the drum 14, to advance the tape, the loop of tape about the roller 34 is shortened, the roller moving against the relatively light tension of the spring 44. At the same time, the brake on the reel 32 is released. Thus the tape may be brought into motion very quickly, the supply reel 32 being only gradually accelerated. When feed by the drum 14 stops, the roller 34 is released by the enlarging loop of the tape and the brake is provided to arrest the reel 32 to prevent overrun. The tape is maintained tensioned in advance of the drum 14 by the action of spring 44.

A date and time printer which is essentially of a standard type is indicated at 54, there being associated with this for effecting both date and time printing and also for other printing, as will appear hereafter, an inked ribbon feeding mechanism involving an intermittent ribbon advancing means comprising the pawl-operating link 56 arranged to be moved by a ribbon advancing solenoid 58. To utilize a single ribbon running between supply and receiving reels, the ribbon desirably passes about a direction reversing plate 55 having the sloping edges 57 and 59 so that two active laps of the ribbon are provided. The time and date printing mechanism is driven from the synchronous motor 60 energized from the power system which is to be monitored and thereby operating the time printing devices according to the effective time of this system. The intermediate driving mechanism at 62 is conventional and forms no part of the present invention, the gearing being such as to advance the various printing wheels indicated at 64 to maintain these in proper positions for the recording of date and time. While various arrangements may be adopted, the printing wheels are shown in FIGURE 1 at 66 to 80, inclusive, there being indicated in that figure the significance of their printing actions. The month and year wheels may, of course, be manually adjusted, and this may also be true of the day wheels 68. The wheels 70, 72 and 74 printing, respectively, the hour, minute and tenth of a minute are automatically driven as is also the wheel 76 indicating a.m. or p.m., the drives of these wheels being intermittent. Wheel 80 is also driven, but continuously, being calibrated desirably in terms of every five-thousandths of a minute. The printing effected thereby may be of one or two of the type markings thereon, depending upon when the printing is effected to give rise to a printed record such as indicated in FIGURE 7, there being desirably printed an arrow by means of a fixed slug so that identification of the time to at least within five-thousandths of a minute may be printed.

Printing by the type just described is effected by means of a hammer 90 carried by bell cranks 100 pivoted at 102 and link-connected to the plunger of a printing solenoid 104.

Typical printing is effected as indicated at 92 and 94 in FIGURE 7. It will be noted that at 96 printing is effected by two of the type markings on wheel 80 and with reference to the arrow 98, the time at which the printing occurred could be read, approximately, as 3:38.387. At 99, however, only one marking appears, and the time would be read as approximately 3:38.865. As will appear, hereafter, these times are actually ascribed to the coded record of the first event following the time stamped on the tape.

To effect recording of events, there are provided a series of hammer levers indicated at 106, each of these being provided with a pivot pin 108 received in a notch 110 in a supporting arm and urged clockwise as viewed in FIGURE 3 by an individual spring 112. Each arm 106 is provided at its end remote from spring 112 with a chisel point 114 adapted to print through the inked ribbon upon the tape an elongated mark. A pin 116 moves within an opening 118 in a supporting arm to limit outward movement of each arm 106.

Each of the hammer arms 106 constitutes an armature for an electromagnet comprising the core members 120 and energizing winding 124. As will appear hereafter each of these electromagnets is momentarily energized by a strong transient pulse to effect a sharply defined imprint by the chisel point 114 of its corresponding hammer arm. Because of the rapid printing action, clear records are made despite the rapid movement of the tape at the time of printing.

As shown at the left of FIGURE 1, the hammers, twelve in number, correspond in their printing functions to the legends there indicated. What is involved may be best made clear by reference to FIGURE 7 which shows that the tape T is ruled longitudinally to provide spaces which are at preprinted intervals on the tape designated as indicated at 105 with numerals and other legends. The first ten of these spaces correspond to the numerical coding of the points at which events are to be recorded. The eleventh channel at 107 is designated "ON" and a marking therein indicates that the event was what might be assumed to be "ON" while an absence of marking would indicate "OFF." The twelfth space or channel on the tape indicated at 109 is arranged to receive time markings which, if the alternating current involved in the system is sixty cycle, would be spaced by one-sixtieth of a second during a recording period to make possible identification of events as to time. The markings made in the various channels are by the corresponding hammers and the interpretation of the record shown in FIGURE 7 would be as follows:

The first event shown thereon is at 111, and at the time the markings for this event were printed there was simultaneously printed the date and time at 92, which is taken as referring to the event at 111. The numerical coding identifies the point involved as that numbered 61, i.e., 40+20+1. The absence of a mark in the "ON" channel indicates that the event was "OFF." (What is to be considered "ON" or "OFF" for a particular point must, of course, be predetermined.) The initial time track marking at 119 coincides with this first event, and the following marks therein of the series represent intervals of one-sixtieth of a second.

The second event of the series shown occurred two-sixtieths of a second after the first event and the coding at 113 indicates that this point was No. 116 and that the event recorded was "ON." The third event at 115 occurring four-sixtieths of a second after the first event involved point 86 passing to "ON" condition. The fourth event at 117 involved the point 67 going "OFF" at six-sixtieths of a second after the first event. Following the last mentioned event, the tape continued to advance through the interval indicated at 121, but in view of the fact that no other event occurred, it then stopped until the occurrence of the next event. It will be noted that twelve sixtieth second markings occur in the time track after the last event, 117, of the series. While this corresponds to the extent of uniform movement of the tape by drum 14, the succeeding part of the interval 121 involves a slight overrun during which the tape is being brought to rest by the brake 48. As will appear more fully hereafter the one-fifth second interval during which the tape moves uniformly is preset as to time to encompass all events which might reasonably be expected to be interrelated in a series.

It will be noted that in FIGURE 7 the events seem to coincide with the markings in the time track. This would be quite generally the case in power systems in which significant events are usually associated with some phase of rise of a sine wave. However, as will appear hereafter, while the timing track markings are determined by the sine wave of a system, the events need not necessarily coincide in time with these track markings, and the track then furnishes a means of interpolation to ascertain the precise timings of the events.

Reference may now be made particularly to FIGURE 4. There is indicated in that figure the operating wiring diagram of the recorder with specific connections, for purpose of illustration, to the coding elements associated with a point numbered 396. Associated with this point is a relay 126. This could be a special relay connected to some line at the point, or could be merely a relay, circuit breaker, or the like, actually associated with a power system. In any event, there would be a contact element 127 especially to be closed to operate the recorder. This contact is connected to a positive supply source 128. (It will be noted that in FIGURE 4 various positive supply sources with respect to ground indicated therein are designated +A, +B and +C. These sources may originate in a common power supply, and the letters A, B and C are used merely to indicate potentials of the sources in decreasing orders of magnitude.) When contact is made at 127, the supply terminal 128 is connected to the recorder input terminal 129 corresponding to the particular point 396 involved. A differentiating circuit is connected to the terminal 129 comprising the resistor 160 in parallel with the series arrangement of capacitor 162 and resistor 164, the junction between the last two elements being connected to the neon lamps 166, 168, 170, 172 and 174 which serve for isolation purposes. This unit is designated generally as 130. Leads from such unit, corresponding to the individual point, are arranged to be selectively connected to a series of terminals which are as follows:

Terminal 132 is an operation terminal and is indicated as to function by (0). Terminals 134, 136 and 138 correspond respectively to hundreds digits of the numerical designations of the points, and are respectively functionally indicated as (300), (200) and (100). Terminals 140, 142, 144 and 146 similarly correspond to tens digits, and terminals 148, 150, 152 and 154 correspond to units digits. The coding adopted has the well known property that to represent any digit between 1 and 9 it is necessary to provide, at most, two terminal connections.

Reference may now be made particularly to FIGURES 5 and 6, which show a desirable system which results in simplicity and particularly in the minimizing of unlike parts in the coding system. Assuming that the recorder is to record events at any of four hundred points, there are provided forty panels indicated by the rectangles in FIGURE 5 at 156. These panels conveniently comprise printed circuit panels which may be structural duplicates of each other, both as to the printed circuitry and as to element connections therewith. Each panel comprises ten of the assemblies of the differentiating circuit and the associated neon tubes shown at 130. To simplify description, however, and to clarify particularly the coding, the aspects of structural similarity may be first disregarded, the description then being followed by an indication as to how this is possible.

Considering the array of panels indicated in FIGURE 5, the rows respectively correspond to 0, 1, 2 and 3 hundreds digits. The columns correspond to 0, 1, . . . 8, 9 as the tens digits. The panels of the first row have their uppermost or first neon bulbs connected to the terminal 132 (0). The panels of the second row have their first neon bulbs connected to terminal 138 (100). Similarly the first neon bulbs of the third and fourth rows of panels are respectively connected to terminal 136 (200) and terminal 134 (300).

The second and third neon bulbs of the panels are connected as indicated at the bottoms of the columns. The first column corresponds to zero in the tens digit position and there is no connection. In the case of the second column the tens digit is 1 and one or the other of the second and third neon bulbs is connected to terminal 146 (10). In the case of the third column the connection is to terminal 144 (20). In the case of the fourth column, the tens digit being 3, the second and third neon bulbs of each group at 130 are connected respectively to both terminals 146 and 144. In the case of the fifth column one of the neon bulbs is connected to terminal 142 (40). This system is followed in FIGURE 5 for the remaining columns, it being noted that in any case no more than two of the neon bulbs, i.e., the second and third are required for the digital indication in the tens position.

The type of connections involved for the units digits are indicated in FIGURE 6 which specifically shows the panel 158 for the points 390 to 399. The ten assemblies of the units 130 on each panel represent, in sequence, the digits 0 to 9 in units position. (Of these assemblies, to avoid unnecessary repetition, there are illustrated only those corresponding to the unit digits 0, 1, 6, 8 and 9.) In each assembly, the fourth and fifth neon bulbs, or only one of them, or in the case of the zero digit, neither, are connected to the various terminals 154, 152, 150 and 148. (In the case of some of the digits the fourth and/or fifth neon bulbs may be omitted in actual construction.) In particular, for consistency with the left hand portion of FIGURE 4, there is indicated in the 6 digit position the assembly 130 which corresponds to the point 396. At the right hand side of FIGURE 6 there are indicated at 176 the series of terminals corresponding to the input terminals of the recorder circuitry running from 132 to 154. However, this number of terminals need not be provided on the panel 158, or on any other panel 156, but the connections may be made by proper wiring of the sockets into which terminals on the panels are inserted. This is due to the fact that the terminals grouped at 178 require, by reason of socket wiring, only one connection on a panel, that connection being uniformly made to the first neon bulbs of all of the ten groups. In the case of the terminals grouped at 180, no more than two connections on the panel are required, the selective connections to the circuitry terminals being made at the sockets, e.g. as illustrated to the terminals representing (70) and (20). Accordingly, only two terminals need be provided on the panel, respectively connected to the second and third neon bulbs, or to only one of them, or neither. In the case of the remaining four terminals, corresponding four terminals are required on the panels because of the various combinations of connections required from the fourth and fifth neon bulbs of the assemblies 130. The result is that there are required only seven output terminals on the panels themselves, and it also follows that the panels of the entire series may be identically wired. Each panel must, of course, have ten input terminals 128.

Reference may now be made to FIGURE 4 for consideration of the circuitry involved to the right of the terminals 132 to 154, inclusive.

Each of the terminals 140 to 152, inclusive, i.e., corresponding to the tens and units digits, is connected to a channel for operation of a corresponding hammer lever 106. These channels are identical, and accordingly, only one is illustrated in the drawing. Connected to the terminal, exemplified by 140, is a transformer 182 connected in association with the rectifier 184 in a full wave circuit arranged to supply an input to a first transistor 186 which is followed by a second transistor 188 to provide two stages of amplification. The transistor circuits are conventional. The output from the second amplification stage feeds the winding 190 of a relay. The armature 192 of this relay is connected to ground through a capacitor 194, the normally closed contact 196 is connected through resistor 198 to a positive supply terminal, and the normally open contact 200 is connected in series with the winding 202 of the corresponding hammer electromagnet, the particular corresponding hammer lever being indicated at 204.

The operation of this particular channel will serve to make clear the operations of some other channels hereafter described and accordingly the operation may be detailed as follows:

Upon energization of relay 126 a positive signal is applied to terminal 129 and differentiated by the differentiation circuit to apply a positive pulse to the bank of neon bulbs associated therewith. The pulse so applied has sufficient potential to fire the neon bulbs of the group associated therewith of which circuits are completed, and this produces a positive pulse at the primary of transformer 182. An identical action will take place when the relay at 126 is deenergized, except for the fact that the pulses will be negative. However, due to the full wave rectifier at 184, irrespective of the polarity of the pulse applied to transformer 182 a negative pulse will be emitted to the transistor 186. This pulse, amplified by the transistors, energizes the winding 190, throwing the armature 192 from the normally closed contact 196 to the normally open contact 200. So long as the normally closed contact remains closed, the capacitor 194 was retained in charged condition. When the armature engages the normally open contact 200, capacitor 194 quickly discharges through the magnet winding 202 thereby producing a sharp short duration stroke of the hammer to provide a corresponding marking on the tape T. The result of the foregoing is that such a mark is provided either upon energization or deenergization of the relay 126.

As will have become apparent from the foregoing description of the coding arrangement, the terminals 140 to 154, inclusive, are also variously connected to others of the units 130, and the purpose of the neon bulbs is to provide isolation in that, while a neon bulb will be fired in that unit to which a pulse is applied by a relay such as 126, the potentials at the terminals 140 to 154 will not be sufficiently great to effect firing of other neon bulbs connected respectively thereto, which firing, if it occurred, would energize other transformers corresponding to 182. Thus signals are provided only in those channels which are supposed to respond to the energization of a relay 126 or to deenergization of such a relay.

Reference may now be made to the channel connected to terminal 138. This channel, except for certain external connections will be observed to be identical with the channel connected to terminal 140, comprising transformer 206 connected to full wave rectifier 208, a pair of transistor stages at 210 and 212, a relay 214, magnet winding 216 and hammer lever 218. A pulse, positive or negative, applied to terminal 138 will, accordingly, operate the hammer lever 218 to produce an indication in the 100 channel of the tape.

The channel connected to terminal 136 is identical with that connected to terminal 138, comprising the transformer 220, rectifier circuit 222, transistors 224 and 226, relay 228 and magnet coil 230 controlling the hammer lever 232. Operation of the latter results in marking in the 200 channel of the tape.

Connected to terminal 134 is a somewhat different arrangement since 300 is indicated by combined markings in the 100 and 200 channels. Terminal 134 is connected through transformer 234 to a full wave rectifying circuit 236 and this is followed by the transistor amplifying stage 238. However, in this case, negative pulses are delivered from this stage through the isolating diodes 240 and 242 to provide pulses to the first transistors 210 and 224 of the 100 and 200 channels. The result, as will be obvious, will be that an input at terminal 134 will provide the combined markings in the 100 and 200 channels.

As has already been mentioned, markings in the "ON" channel of the tape result from one of two alternative operations at a point while the other operation produces no such marking, the absence of which signifies "OFF." In the arrangement illustrated, a positive pulse applied at terminal 129 is arbitrarily considered to be an "ON" pulse, and to produce a corresponding marking of the tape, the terminals 138, 136, 134 and 132 are all connected by the individual diodes 244, 246, 248 and 250 to the primary of a transformer 252, the diodes not only providing isolation to prevent improper routing of pulses but also being arranged so that only positive pulses will energize the transformer primary. The secondary of the transformer 252 is connected to the full wave rectifying circuit 254 and the channel is essentially identical to that connected to terminal 140, the rectifying circuit being followed by the two transistor amplifying stages 256 and 258, the latter feeding the relay 260 to provide energization of the magnet winding operating the "ON" hammer lever 264. While the connections particularly involved with respect to terminal 132 have not yet been described, it will be noted from FIGURE 5 that when the hundreds digit is 0 connections are made to the terminals 132 (0) so that from the standpoint of operating the hammer 264, the terminals 132, 134, 136, and 138 are equivalent, all corresponding to hundreds digits, in this case including 0.

Since 0 in the position of hundreds digits does not involve recording on the tape, the terminal 132 has as its primary function (besides partaking in the "ON" indication) the control of the time printer, the time track, the ribbon feed, and the tape driving motor. The connections to this terminal are, accordingly, special ones. A pulse delivered to terminal 132 is applied through transformer 266 to the full wave rectifier 268 which provides a negative output pulse irrespective of the sign of the pulse applied to terminal 132. The negative pulse is applied to the base of the transistor 270. Negative pulses are also applied to this transistor base through the diodes 272 and 274 respectively connected between the first and second amplifying stages of the 100 and 200 channels. Since signals in either or both of these channels are thus applied to transistor 270, signals also result when a pulse is applied to terminal 134, since such pulses operate the first stages of amplification in the two channels. The overall result is that a pulse of either sign applied to any of the terminals 132, 134, 136 and 138 will result in an operating signal applied to transistor 270. A second stage transistor 276 amplifies the signal and operates relay 278 the armature of which is connected to positive supply terminal 282 which is also connected to the upper terminal 290 of a capacitor 286, the lower terminal 284 of which is connected at 280 to the normally open relay contact, with the result that energization of relay 278 effects shorting of the capacitor 286.

A diode 292 is arranged to pass a negative pulse from the emitter of transistor 270 to the base of transistor 294 between which and terminal 282 there are connected in parallel capacitor 296 and resistor 298. The amplified pulse is delivered to a second transistor stage at 300 the output of which is connected to relay 304. Terminal 284 of capacitor 286 is connected through resistor 302 to the base of transistor 300. The arrangement just described operates as follows:

Under static conditions, with the contacts of relay 278 open, the capacitor 286 has a charge which in effect leaves the transistor stages directly connected as if the capacitor were absent. However, when the capacitor 286 is short-circuited by the action of relay 278, this condition is disturbed and the transistor 300 continues to supply current to relay 304 for a predetermined period depending upon the time constant of the RC circuit 286, 302. This time constant is typically chosen so that the relay 304 is deenergized to drop its contacts only after a predetermined interval which may, typically, be about one-fifth second corresponding to twelve cycles of the sixty cycle current involved. The relay 278, however, pulses with each input through its channel and at each pulse the delay of deenergization of relay 304 restarts. The overall result, accordingly is that the relay 304 becomes deenergized only one-fifth second following the last event pulsing the relay 278 which follows another event by an interval less than one-fifth second. As will appear, the tape is advanced from the time of occurrence of the first event of a series of events until a fifth second after the last of the series provided no pair of successive events of that series are spaced by more than a fifth second.

The relay 304 controls a number of operations. Its movable contact 306 engages, upon relay energization, the fixed contact 308 which is connected to the ungrounded terminal of capacitor 310 and through the parallel arrangement of the winding of relay 314 and resistor 316 to a positive supply terminal. The movable contact 306 is connected to ground through the time printer solenoid 104 which is shunted by the spark suppressing diode 320.

The movable contact 322 of relay 314 is connected to the ribbon feed solenoid 58 which is shunted by the spark suppressing diode 330. The fixed, normally opened contact of relay 314 is connected to ground through capacitor 324 and to a positive supply terminal through resistor 326. The operation of the relay 304 with respect to the elements just described is such that its energization effects discharge of capacitor 310 through the time printer solenoid 104 to effect printing of time and also energization of the relay 314 which in turn effects discharge of capacitor 324 through the ribbon feed solenoid 58 to advance the inked ribbon. As will be evident, these actions occur only once in that cycle of operation which involves a series of events quickly following each other in the one-fifth second delay heretofore described, the operations taking place at the beginning of such a cycle.

The double throw movable contact 332 through its normally closed contact and connection 334 connects a positive terminal through resistors 342 and 344 to the windings 336 and 338 of motor 4 to ground. In series with one of these windings is the capacitor 340 to provide phasing. A small direct current flows through the winding 338.

When the relay 304 is energized, the movable contact connects the motor windings through lead 348 to the secondary of a transformer 350 which is energized from the alternating current terminals 352. The motor, as has already been stated, is of a high starting torque type capable of coming up to full speed within one cycle and this motor runs so long as the relay 304 is energized.

Upon energization of relay 304 the motor windings are disconnected from resistor 344 and its elements. Collapse of the field in the winding 338 resulting from the previous current flow produces a negative current pulse through diode 354 to energize the winding of relay 356. Prior to this capacitor 362 was charged through resistor 360 from a positive supply terminal through the movable contact 358. When the relay 356 is energized by the pulse just mentioned through diode 354, the normally opened contact is closed producing discharge of capacitor 362 through relay 364 and operation of the time track hammer lever 366 to produce the first time track marking of a series. Thereafter, each negative cycle applied to the motor produces another negative pulse through diode 354 to provide successive time track markings spaced by one-sixtieth of a second. The time track markings are recorded so long as the motor is energized.

When the relay 304 is deenergized, connection is reestablished between the lower end of resistor 344 and the winding 338 of the motor. The relay 344 has only a low resistance value and accordingly the charged capacitor 346, which is of large capacitance value produces a heavy direct current flow momentarily through the winding 338. This brings the motor very quickly to rest, and in practice it may coast only for two or three-sixtieths of a second as indicated by the extension of the interval indicated at 121 in FIGURE 7 beyond the last marking in the track.

The various detailed operations of the recorder have already been indicated, and the overall operation may be briefly outlined as follows:

The tape is normally at rest. Upon the occurrence of an event corresponding to energization of a relay such as 126 a series of actions occur substantially simultaneously involving recording on the tape by means of the hammers 106 of the code designation of the point at which the event occurred, whether this was "ON," and an initial time marking. At the same time the date and time are printed as indicated at 92 in FIGURE 7, the ribbon feed is advanced, and the motor 4 brought rapidly to full speed.

Successive events are then recorded by the hammers 106 if they occur within the one-fifth second time interval following any event of a series. The motor continues to run and the time track markings are successively made. However, the time printer and ribbon feed are not again operated through the interval of running of the motor 4.

One-fifth second after the occurrence of the last event of a rapidly recurring series the relay 304 is deenergized effecting stopping of the motor and leaving the tape in condition to record another event.

While a specific mechanical and electrical embodiment of the invention has been described, it will be evident that the invention is not limited to the use of the elements aforementioned. The transistor amplifiers may, of course, be replaced by thermionic tubes with suitable changes in circuitry and in fact the general circuitry is subject to being very substantially changed in many respects. The condenser discharge arrangements for producing pulses through solenoids and magnet windings may be replaced by pulse transformer arrangements provided power amplification is carried out to a sufficient extent. It is accordingly to be recognized that the invention is not limited in its scope except as required by the following claims.

What is claimed is:

1. A recorder comprising tape feeding and guiding means, signal input terminals, coding means receiving inputs from said terminals and providing, for an input from each terminal, a combination of substantially simultaneous output signals identifying input signals, means receiving each combination of said output signals for recording them in transverse alignment in longitudinally extending channels on said tape, there being one channel corresponding to each output signal, means identifying on said tape the time of recording of a combination of said output signals, and means initiating high speed feed of said tape substantially concurrently with the recording of said output signals and for maintaining feed of said tape for a predetermined period following said recording.

2. A recorder according to claim 1 including means for periodically marking time intervals on said tape during said maintained feed thereof.

3. A recorder according to claim 1 in which said time identifying means includes a continuously rotating printing wheel carrying time-identifying markings and means for imprinting the tape by said wheel during the rotation of the wheel.

4. A recorder comprising tape feeding and guiding means, signal input terminals, coding means receiving inputs from said terminals and providing, for an input from each terminal, a combination of substantially simultaneous output signals identifying input signals, means receiving each combination of said output signals for recording them on said tape, means identifying on said tape the time of recording of a combination of said output signals, and means initiating high speed feed of said tape substantially concurrently with the recording of said output signals and for maintaining feed of said tape for a predetermined period following said recording.

5. A recorder according to claim 4 including means for periodically marking time intervals on said tape during said maintained feed thereof.

6. A recorder according to claim 4 in which said time identifying means includes a continuously rotating printing wheel carrying time-identifying markings and means for imprinting the tape by said wheel during the rotation of the wheel.

7. A recorder comprising tape feeding and guiding means, signal input terminals, coding means receiving inputs from said terminals and providing, for an input from each terminal, a combination of substantially simultaneous output signals identifying input signals, means receiving each combination of said output signals for recording them in transverse alignment in longitudinally extending channels on said tape, there being one channel corresponding to each output signal, means identifying on said tape the time of recording of a combination of said output signals, and means initiating high speed feed of said tape substantially concurrently with the recording of said output signals and for maintaining feed of said tape during recording of further output signals following shortly after the first mentioned output signals and for a predetermined period following the recording of the last of said further output signals.

8. A recorder according to claim 7 including means for periodically marking time intervals on said tape during said maintained feed thereof.

9. A recorder according to claim 7 in which the last mentioned means terminates said feed at the end of said predetermined period.

10. A recorder comprising tape feeding and guiding means, signal input terminals, coding means receiving inputs from said terminals and providing, for an input from each terminal, a combination of substantially simultaneous output signals identifying input signals, means receiving each combination of said output signals for recording them on said tape, means identifying on said tape the time of recording of a combination of said output signals, and means initiating high speed feed of said tape substantially concurrently with the recording of said output signals and for maintaining feed of said tape during recording of further output signals following shortly after the first mentioned output signals and for a predetermined period following the recording of the last of said further output signals.

11. A recorder according to claim 10 including means for periodically marking time intervals on said tape during said maintained feed thereof.

12. A recorder according to claim 10 in which the last mentioned means terminates said feed at the end of said predetermined period.

References Cited in the file of this patent

UNITED STATES PATENTS

| | | |
|---|---|---|
| 988,218 | Sohm | Mar. 28, 1911 |
| 1,551,220 | Scheffler | Aug. 25, 1925 |
| 1,827,208 | Riebe | Oct. 31, 1931 |
| 2,086,913 | Kelly | July 13, 1937 |
| 2,129,762 | Harrison | Sept. 13, 1938 |
| 2,517,316 | Holmes | Aug. 1, 1950 |
| 2,628,277 | Spencer | Feb. 10, 1953 |
| 2,693,593 | Crosman | Nov. 2, 1954 |
| 2,705,105 | Paschen | Mar. 29, 1955 |
| 2,749,484 | Levitt | June 5, 1956 |
| 2,755,162 | Krahulec et al. | July 17, 1956 |
| 2,817,079 | Young | Dec. 17, 1957 |

FOREIGN PATENTS

| | | |
|---|---|---|
| 541,854 | Belgium | Oct. 31, 1955 |

(Corresponds to French Patent No. 1,136,895)

| | | |
|---|---|---|
| 781,084 | Great Britain | Aug. 14, 1957 |

(English language patent corresponding to French patent #1,136,895)

| | | |
|---|---|---|
| 1,041,450 | France | May 27, 1953 |
| 1,136,895 | France | Jan. 7, 1957 |